June 11, 1963   W. J. ROZMUS   3,093,018
APPARATUS FOR MULTIPLE UPSET WELDING
Original Filed Jan. 28, 1959   2 Sheets-Sheet 1

INVENTOR.
WALTER J. ROZMUS
BY WATTS, EDGERTON, PYLE + FISHER
ATTORNEYS

June 11, 1963 W. J. ROZMUS 3,093,018
APPARATUS FOR MULTIPLE UPSET WELDING
Original Filed Jan. 28, 1959 2 Sheets-Sheet 2

INVENTOR.
WALTER J. ROZMUS
BY WATTS, EDGERTON, PYLE + FISHER
Ray S Pyle ATTORNEYS United States Patent Office 3,093,018
Patented June 11, 1963

3,093,018
APPARATUS FOR MULTIPLE UPSET WELDING
Walter J. Rozmus, Whitesboro, N.Y., assignor to Kelsey-Hayes Company, Detroit, Mich., a corporation of Delaware
Original application Jan. 28, 1959, Ser. No. 789,669. Divided and this application July 1, 1960, Ser. No. 40,321
12 Claims. (Cl. 78—82)

This invention relates in general to pressure welding techniques, and relates more specifically to apparatus of joining light gauge material.

This is a division of United States patent application S.N. 789,669, filed January 28, 1959, and entitled "Projection Control and Method for Pressure Welding."

Pressure welding of aluminum and copper is now a well known and common process. Many useful apparatuses have been developed for producing and controlling the upset forge action needed to cause such welds.

It has been found that a true metallurgical weld is produced by extending a length of the workpiece from the dies sufficient to allow the contacting surfaces to expand in area while in mutual contact under high pressure.

It has also been determined that pressure welds cannot be created whenever contamination exists between the surfaces. Even a finger print by a clean hand can prevent a weld.

Further, in sections of thin gauge, good butt pressure welds have never been produced because the thin material tends to fold rather than forge if sufficient material to produce a weld is projected from the weld dies.

Hence, one of the principal objects of this invention is to provide an improved apparatus adapted to perform a new method of carrying out a pressure weld procedure, to produce a good butt weld of thin gauge material, either in sheet form or wire.

Another object of this invention is to provide an improved apparatus to perform a new process which obviates the need for special prior workpiece preparation or cleaning.

More specifically, it is the object of this invention to provide apparatus adapted to perform a multi-step weld procedure carried out to an extent that will produce a complete interface movement to the flash area of a pressure weld, in thin gauge material to assure a weld, and in any material to avoid the necessity of prior cleaning.

Another object of this invention is to provide new and improved apparatus to provide an accurate workpiece projection from the face of a welding die, and which will permit a superior workpiece cleaning and preparation of workpieces when such preparation is desired.

Other objects and a fuller understanding of the invention may be had by referring to the following description and claims, taken in conjunction with the accompanying drawings, in which:

Figure 7:
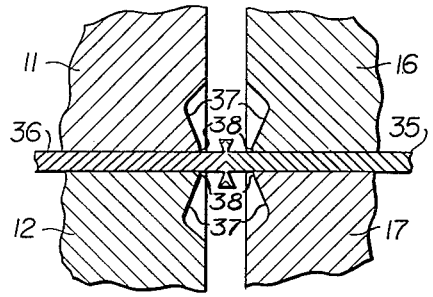
Figure 8:
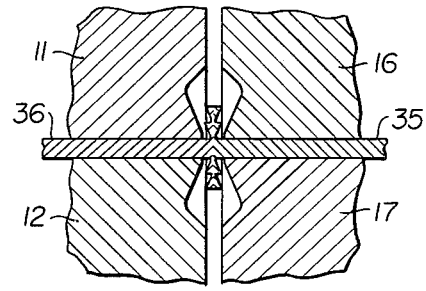
Figure 9:
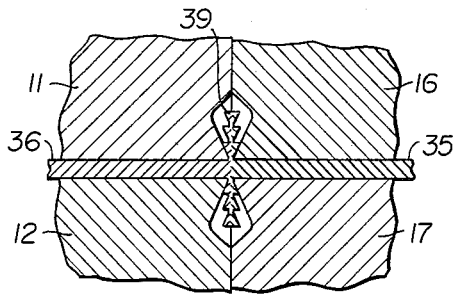
Figure 10:
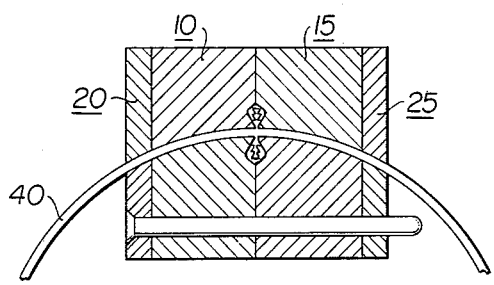

FIGURES 7, 8, and 9 illustrate the new process steps employed to successfully weld very thin materials, and/or to weld without cleaning prior to welding; and, FIGURE 10 illustrates a practical commercial use of the apparatus and process of this invention in the making of annular rings, tubes or cans.

There are many possible devices which may be employed to activate pressure welding dies. Some such devices are hand operated such as that described and claimed in United States Patent No. 2,889,622 issued June 9, 1959, to William A. Barnes, and entitled "Cold Weld Butt Tool." The apparatus of this invention may be carried and actuated by such a hand tool. The apparatus of this invention may also be actuated by other power tools such as those which have been built as bench and floor model press type machines. One such machine is described and claimed in United States Patent No. 2,909,086 issued October 20, 1959 to William A. Barnes et al. and entitled, "Machine and Die Control Apparatus for Applying Cold Welding Pressures."

Since the force used to close a pair of split dies may be supplied in any of these suitable manners and the force employed to close the split dies toward one another may also be obtained from any of the suitable devices, the drawings of this teaching are set forth schematically in order to illustrate the new concept which has been developed and tested to solve a particular problem. Thus, the reader need not be confused as to the teaching which is attempted here, and can adapt this basic teaching to small or large apparatus as his needs may dictate. The apparatus which is to be hereinafter described, and which is illustrated in the drawings, and the process which will be set forth have all been actually employed and proven by the use of adapted actuating equipment not necessarily intended for the operation of the illustrated dies. Thus, the drawings illustrate a truly operative equipment although not necessarily commercially perfected or adapted apparatus.

Broadly stated, the basic process concept of the present invention, is embodied in the method of producing a true pressure created butt weld between members which are normally too thin to weld by the accepted techniques. Subgeneric to this basic concept of the process is the discovery that whether the workpieces are too thin to weld by ordinary processes or not, they can be successfully welded in a true pressure weld without the necessity of first cleaning the members.

To clarify for better understanding, it should be recognized at the outset that all pressure junctions created between metal members are not necessarily true pressure welds. Pressure alone will create a bond which is not a true weld between two pressure weldable materials; such, for example, as aluminum and copper. Pressure bonding created by pressing large areas together under considerable pressure will produce a strong bond which is not an actual weld. This process is being used for many types of structures, such as the tube walled refrigerators now being commercially produced. However, pressure bonding alone is not always satisfactory for all purposes; it is entirely possible to create a true pressure weld by confining of flow of the metals as they move outwardly from the pressure area under confinement and high pressure. It is the latter true pressure weld which is of concern in this instance.

Figure 1:
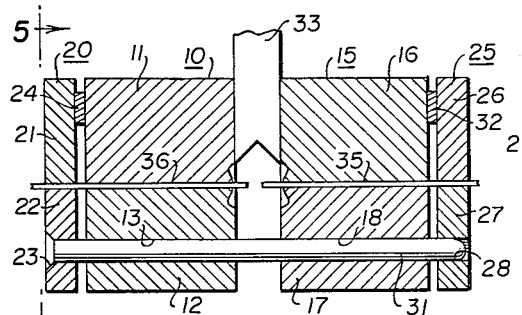
FIGURE 1 is a schematic illustration of pressure weld dies embodying the structural principles of this invention, and capable of carrying forth the new process concept.

In FIGURE 1 of the drawings, the schematic illustration of apparatus, there is set forth a composite split die 10 and a composite split die 15. Die 10 is composed of an upper section 11 and a lower section 12. Die 15 is composed of an upper section 16 and a lower section 17. These dies are not particularly unique in any material respect and they comprise a conventional passageway through the split die by reason of mated cavity surfaces on each of the die sections. Furthermore, the face areas of the dies are formed in the manner best illustrated in the larger sections of FIGURES 7–9. These spaced formations as disclosed in this application differ from those in the parent application somewhat, as will be described in greater detail below. A similar multi-step process and apparatus are also described in United States patent application Serial No. 789,670, filed January 28, 1959, by Stanley Zysk, for "Plural Step Pressure Welding Apparatus." As has been suggested above, the split die apparatus of this invention may be actuated by any of a number of suitable apparatuses. The apparatuses of the referenced patents are illustrative of suitable mechanism. Thus, any apparatus which will clamp the two die sections together and thereafter move the composite dies together in face-to-face abutment with sufficient pressure to upset and weld the workpieces will be satisfactory.

It is necessary that the dies 10 and 15 move in true relationship with respect to one another and be held against offset movement under the thrust created by the upset welding action. To illustrate a suitable type of guide device a guide bar bearing passageway 13 is provided in die section 12 and a similar bearing passageway 18 in the die section 17. Guide bar 31 is then employed as a rail or guide device to keep the dies in alignment, and in this case, in rectilinear movement.

Although the process invention which is disclosed in detail in the parent application permits cleaning and preparation of workpieces to be eliminated, it is often desirable to clean workpieces before welding. Prior to the invention disclosed in the parent application it has always been assumed that cleaning was essential. One may refer to the early patents granted to Sowter of the General Electric Co., England, to see the great emphasis upon cleaning. In fact, Sowter has taught that only scratch brushing would be sufficiently adequate to prepare workpieces for pressure welding. Chemical cleaning was believed by Sowter to be unsatisfactory.

Apparatus has been provided which will create a clean cut on the end of a pair of workpieces to be butt welded, and this apparatus is used after the workpieces are clamped in the dies in order to prevent any recurrence of contamination by oxidation, finger prints, or other foreign matter. In addition, apparatus has been introduced which has guide and stop devices to hold a blade at a fixed distance from the surface of a die in order not only to prepare the workpiece for immediate welding but also to accurately gauge the distance of projection of the workpiece from the die. It has been shown that only a certain optimum projection of workpieces from pressure dies is capable of producing a good weld. This projection is closely related to the cross-sectional thickness of the workpiece. In average wire and sheet the projection is somewhere around a distance equal to a cross-section thickness of the metal being welded. The exact projection distance must be determined by the particular material and form of material. The principles for selecting the projection distance are now well known and understood, and therefore it is not essential to outline these requirements here.

However, the preparation of workpieces at a distance from the face of the dies has necessitated special equipment and even then it is sometimes difficult to obtain a good preparation at a distance from the die face and to be sure that the projection after preparation is exactly as required. The apparatus of this invention solved that problem to perfection. Referring once again to FIGURE 1, it may be seen that a gripping jaw 20 having a section 21 and a section 22 is associated with the split die 10 and that a similar gripping jaw 25, having a section 26 and 27 is associated with the split die 15. The jaw 20 is slidable relative to the die 10 upon the guide bar 31. A guide bar bearing opening 23 is provided to permit such guided movement. In like manner, the gripping jaw 25 is guided upon the same guide bar 31 by means of the guide bar bearing opening 28. The gripping jaws are not in any way connected to or limited in their travel by any inherent relationship with respect to their associated dies. They are located adjacent the back surface of the dies, as illustrated, and unless otherwise constrained are free to move between a contact position against the back surface of the associated die, or removed from the back surface a distance as far as desired or limited by any suitable stop means which may be chosen. In fact, they may be completely separable from the construction if so desired.

Associated with each of the split dies and its related gripping jaw is a spacer device. Between die 10 and gripping jaw 20 there is provided a spacer 24. Between the die 15 and the gripping jaw 25 there is a spacer 32.

Figure 5:
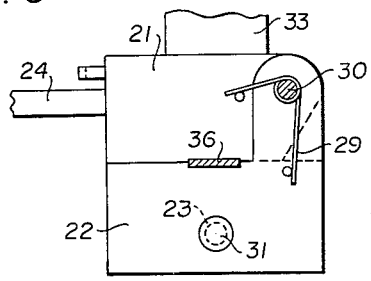
FIGURE 5 is an end view taken along line 5—5 of FIGURE 1.
Figure 6:
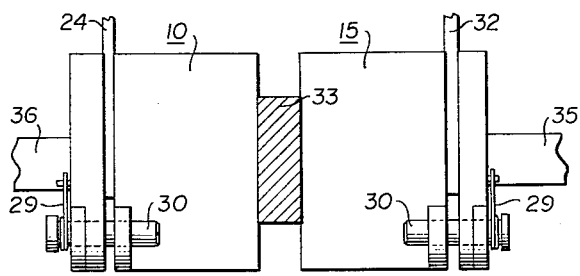
FIGURE 6 is a top plan view of the die group of FIGURE 1.

Reference to FIGURE 5 and to FIGURE 6 will illustrate more clearly the interrelationship of the dies and their gripping jaws and spacers. The gripping jaws are designed to grasp a workpiece which is extended through the associated split die. The grip is not an extremely great grip, but is tight enough to prevent slippage. A spring 29 will usually suffice to create a closing action of sufficient gripping force. In the FIGURE 5 it will be seen that the top section 21 of the gripping jaw 20 is pivoted upon a pivot pin bar 30 carried by the lower section 22. The bar 30 extends completely along the apparatus and serves as an operational pivot for the gripping jaw 25 and its associated sections 26 and 27. Thus, the gripping jaws are pivotally actuated and urged together by a resilient holding force, and are provided with two guide rail devices for easy longitudinal movement between the active stations of the gripping jaws.

Also as best seen in the FIGURE 6 is a knife device 33 which is pivotally swung upon the pivot pin bar 30 and is movable between the face areas of the dies 10 and 15. By bringing the knife 33 between the dies and then urging the dies snugly against the surfaces of the knife, the knife can be brought down between the dies and will cut off any part of a workpiece projecting from the face of the dies. Any such cut, it will be readily recognized, will be a clean square-ended severance for the simple reason that the workpiece is fully supported by the workpiece holding cavity and hence only the projected portion will be cut away without any drag or deformation of the workpiece face. If desired roughened metal surfaces may be employed on the knife or the knife may be formed of a particular material which will aid in galling the workpiece surfaces.

To complete the teaching of this first aspect of this invention, the operation of the apparatus will now be explained. Workpieces are selected, as illustrated in the drawings by the reference characters 35 and 36. These workpieces illustrated in FIGURE 1 are ribbons of thin gauge metal which normally would not be projectable a distance from the dies sufficient to cause a proper weld. These workpieces are grasped in the respective dies 10 and 15 with a light holding force. Spacers 24 and 32 are moved into the position illustrated in FIGURE 1 and the respective gripping jaws 20 and 25 are moved against the spacers as illustrated. Thus, the distance of the jaws with respect to the back surfaces of the dies is accurately determined by the gauge of these spacers. The jaws are permitted to grip the workpieces at this time with a grip provided by the spring actuation for holding the workpieces temporarily. After the jaws have gripped the workpiece, the knife 33 is brought down between the die faces as before described, and the excess projection of the workpieces from the face of the dies 10 and 15 is severed cleanly and smoothly to the die faces.

Figure 3:
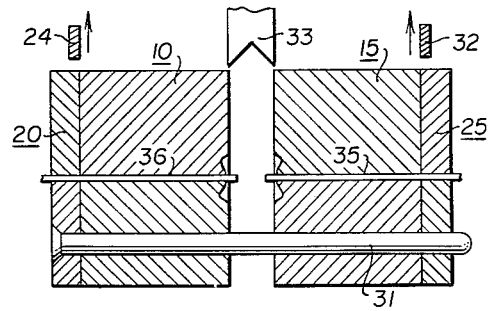
FIGURE 3 illustrates the improved new projection advancement step produced by this invention.

After the severing has been effected, the knife is removed from the position between the dies and the spacers are swung out of the stop condition, as illustrated in the FIGURE 3. Thereafter the gripping jaws are moved against the back surfaces of their respective dies. In so advancing, as illustrated in FIGURE 3, the workpieces are advanced through the split dies and will project once again from the face areas of the split dies. However, the amount of advancement is precisely and accurately determined. The distance will be equivalent to the gauge of the spacer parts provided. Hence, it will be seen that this advancement can be accurately controlled by selecting the desired thickness for the spacer members.

After the jaws have been positioned against the back surfaces of their respective dies, the entire assembly is then actuated by the selected apparatus to grip tightly upon the split dies and clamp the workpieces in the split dies with a holding force of great magnitude. The driving force is applied to the back of the entire assembly to move the split dies against one another in face-to-face abutment and create a mutual upsetting of the abutted workpieces.

If the workpieces are of sufficient thickness that they will create a weld in one welding operation, then the steps as thus far described will be sufficient and the workpieces may be removed from the dies and the excess flash trimmed from the weld area.

This apparatus has been found to be operable to carry out a process of new discovery having tremendous importance. As previously indicated, it is not always possible to project sufficient material from the die surfaces whenever an exceedingly thin gauge material is to be welded. In FIGURES 7 through 9, a progressive weld operation is illustrated. The fragmentary sections set forth in the FIGURES 7, 8, and 9 are enlargements of the weld area of the composite die. The FIGURE 7 is an enlargement of the initial upset stage illustrated in FIGURE 4. It will be seen that the amount of flash material projecting from the weld area is quite small. Such amount of projection would normally be insufficient to have created a genuine cold pressure weld. As previously stated, the essence of creating a true pressure butt weld is to cause a mutual flow of material under extreme pressure and confinement to a degree great enough to allow the material to integrate and create a complete composite weld.

Figure 4:
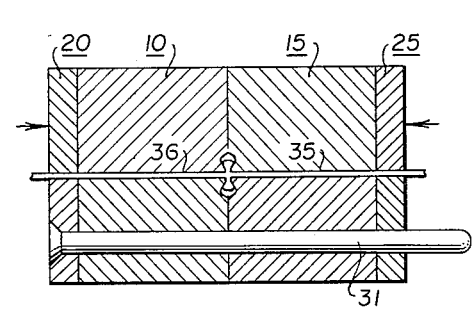
FIGURE 4 illustrates a weld closing step in the use of the apparatus.

It has been discovered, completely contrary to many previous teachings with respect to pressure weld, that rather than accept a partial weld as created by this first step of operation illustrated in FIGURES 4 and 7, that the dies may be opened a distance corresponding to approximately twice the projection distance of one of the original workpieces and the dies once again clamped upon the workpieces and closed in a second, or even a third and more operations, to rework the weld and cause a continuation of the inner face upsetting until the material has been moved aside by working to a degree which creates a complete and true pressure weld. Three such steps are illustrated in the series of FIGURES 7 through 9. In the final FIGURE 9 it will be seen that the weld cavity has been partially filled to a degree corresponding volumewise to the degree normally created in a thicker material heretofore welded in a single operation. The workpieces have not been bent aside as would normally be expected for the reason that the series of upsets have taken place in small increments and have been repeated a number of times rather than to attempt a one-step welding operation. The resultant weld creates a series of generally triangular shaped flashing sections 39 joined together in chainlike fashion. There is, of course, one such triangular section for each upset. This multiple upset concept has been fully established as being acceptable to create a very strong and true pressure weld in thin gauge sheet materials.

Figure 2:
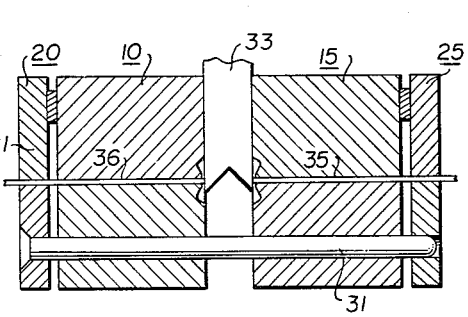
FIGURE 2 illustrates a work preparation step sometimes employed prior to weld operation.

Finally, in the carrying forth of this process as described, a truly remarkable discovery has been made contrary to all previous pressure welding teaching, and that discovery is that the cleaning and preparation step as illustrated in FIGURES 1 through 3 of the drawings may be avoided in either thin material or conventional gauge material by the repeated upset process. It has been discovered that the material which is contaminated and dirty on its edge, and hence normally considered unweldable, may in fact be welded by repeating the upset process until all of the contaminated material has been caused to flow out of the weld area into the form of a flash. If conventional gauge material is employed, such repeat upsetting process will require a greater-than-normal cavity on the die faces to hold the excess material. This discovery is of exceedingly great importance to the use of pressure welding of sheet for commercial applications. For example it has long been desired to make aluminum containers for food, oil and other materials. The efforts heretofore have been confined to lap welded seams for the simple reason that the gauge of the material which is desired for such a container has been less than that considered to be butt weldable. By the repeat process set forth herein, such butt welding is entirely possible.

Now it has been discovered that this invention will make the production of sheet welds for producing can seams even more practical because the cleaning step may be eliminated. Thus, the rapidity and speed of production necessary for economical production of cans is entirely possible.

The faces of the dies as disclosed in FIGURES 7 through 9 each have very subtle but highly important refinements in configuration when compared with the design which has heretofore been considered essential to the proper formation of a cold pressure weld.

A welding chamber is defined in part by sloping walls 37 of recesses in the abutment face of each of the die sections 11, 12, 16 and 17. In prior arrangements, the portion of the die faces corresponding to surfaces have extended inwardly and then turned 90° to provide substantially knife edges adjacent the workpiece and substantially in the plane of die abutment. Here the sloping walls 37 taper upwardly from a deepest spot in the recesses which define the welding chamber to an endless flash pinching portion 38 which surrounds the workpiece. The walls 37 are rounded to define the flash pinching portions 38 thus forming an acute angle to provide a resultant workpiece flash which is joined to the workpiece by a very thin web. In short, the improvement has edges which substantially pinch off the flash.

The FIGURE 10 illustrates a practical commercial use of the present invention. Here it will be seen that the sheet of material has been bent in order that a can may be formed. The bending is such that each of the ends of the single sheet are abutted as illustrated with the separate workpieces in the previous figures. Without any cleaning preparation whatsoever, the repeat process as described will cause a flow of the contaminated dirty edges completely out of the weld area and a perfectly acceptable butt welded seam results.

The first step in making such a can by this process is to produce a cylindrical form without ends. Such step is illustrated in FIGURE 10. Then, if desired, the excess flash material may be removed even from the inside of the cylinder. Thereafter, this completely welded, truly reliable, cylindrical structure, may be fitted with pressure welded end caps to seal the contents within a container.

Although the invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Tooling for forming a pressure weld comprising, first and second opposed dies, each having a weld formation face and a spaced opposite end face, said dies being relatively movable in a common work performance travel path, first and second workpiece gripping members, said first workpiece gripping member being positioned adjacent the opposite end of said first die, and said second workpiece gripping member positioned adjacent the opposite end of said second die, said dies and said members each including surfaces adapted to grip a workpiece, guide means in operative connection with each of said dies and said members for guiding said dies and said members in work performance travel, said members and said dies being relatively movable between a first work performance station wherein the said members are spaced from said opposite ends of said dies, and a second work performance station wherein said first and second members each abut one of said opposite ends of said dies, and means to orient the gripping members into a selected one of said work performance stations.

2. In the device of claim 1 wherein each die includes a pair of gripping surfaces and each weld formation face includes a sloping wall adjacent each gripping surface and wherein each sloping wall and adjacent gripping surface together form an acute angle.

3. Tooling for forming a pressure weld comprising, first and second opposed split dies, the first die having a weld formation face and a spaced opposite end face, the second die having a weld formation face and a spaced opposite end face, said die formation faces being opposed faces matable for the formation of a pressure weld, each die having a through internal workpiece passage extending from said weld face to said opposite end face, first and second workpiece gripping members, said first workpiece gripping member positioned adjacent said first die opposite end face, said second workpiece gripping member positioned opposite said second die opposite end face, each of the said members having a workpiece aperture therethrough, a guide bar, said first and second dies and said first and second members slidably carried by said guide bar along a work performance travel path, said internal workpiece passages of the first and second dies and the workpiece apertures of the first and second members being in axial alignment, said first members and said first die being relatively movable between a first work station wherein said first member is spaced from said opposite face end of said first die and a second work station wherein said first member abuts said opposite face end of said first die, said second member and said second die being relatively movable between a first work station wherein said second member is spaced from said opposite face end of said second die and a second work station wherein said second member abuts said opposite face end of said second die, first and second spacing fingers, said first spacing finger being removably placeable between said first member, and said first die, and in abutment with said member and the opposite face end of said first die when positioned at said first station, and said second finger being removably positionable between the said second member and said second die, and in abutment with said member and said opposite face end of said second die when at said first station, said fingers indexing said members and said die into said first position when in abutment.

4. Device of claim 3 in which cutter means is adapted to move between said weld formation faces in slidable contact with each weld formation face to trim a workpiece held therein and projecting therefrom.

5. In a metal working apparatus wherein a die is provided with a work face, a rear surface, other surfaces defining a workpiece holding passageway from the face to the rear surface, the provision of improved means to establish a required projection distance of a workpiece with respect to the die face, comprising, a jaw mounted adjacent said die rear surface, guide means, said jaw mounted by said guide means, said die mounted by said guide means, said die and said jaw being relatively movable along said guide means to a first station wherein said jaw is spaced from said rear surface and a second station wherein said jaw abuts said rear surface, said jaw and said die each having a workpiece grip condition and a workpiece release condition, and spacer means removably positionable between said jaw and said die rear surface to determine said first station, whereby a piece may be extended from said jaw through said die substantially flush with respect to said die work face, said spacer means used to establish the distance of the said die rear surface from the jaw and then removed, said die and said jaw releasably moved to the said second station with the die in the said workpiece release condition to thereby index the said workpiece through said die.

6. Tooling for performing a pressure weld comprising, first and second split dies having parallel abutment faces, guide means operably connected to each of the dies and maintaining the faces parallel, the guide means permitting relative rectilinear movement of the dies toward and away from one another, said dies having a first work performance position with the faces spaced from one another and a second work performance position with the faces in abutment with one another, said dies each including a through workpiece receiving passage extending from the die face to an opposite face and sections separable to receive such workpiece, said die sections being adapted to be urged into gripping abutment with a workpiece disposed in each such workpiece receiving passage, each of said dies including an endless flash receiving recess in its face and surrounding the workpiece receiving passage, said recesses each tapering from a deepest location toward the face and terminating at an endless flash pinching portion surrounding and adjacent the workpiece receiving aperture structural means to cause a predetermined amount of workpiece to project past the pinching portion of each such die when the dies are in their spaced position and said structural means coacting with the dies and work pieces to control relative movement of the dies and work pieces when the dies are open and said relative movement occurs subsequent to a first welding actuation and prior to a second welding actuation of the dies, said structural means also holding said work pieces against movement relative to one another when the dies are open after said first welding actuation.

7. The tooling of claim 6 wherein each pinch portion is spaced from the planes of the die abutment faces on a side of each plane remote from the opposite die.

8. The device of claim 6 wherein the recess has a volume sufficient to surround the flashing produced by a plurality of welding actuations.

9. Tooling for forming a pressure weld comprising, first and second split dies, each split die having a work face including a weld formation recess, each such die also having a work holding passage extending therethrough and communicating with such recess, guide means coacting with each of the dies to maintain the dies in oriented face-to-face relationship, workpiece gripping means positioned in spaced relationship with the dies therebetween, said guide means coacting with the gripping means to maintain the latter in spaced relationship, spacing means coactable with the workpiece gripping means to space each such workpiece gripping means a predetermined distance from the adjacent die, said spacer means being removable to permit each such workpiece gripping means to be brought into abutment with its adjacent die.

10. Tooling for pressure welding comprising,
 (a) first and second split dies each adapted to grip a workpiece and each having a weld formation face;
 (b) guide means connected to the dies to maintain the faces oriented in face to face relationship; and,
 (c) indexing means operatively connected to the dies to hold a pair of work pieces while the dies are opened and separated from one another after a first workpiece upsetting operation and to index the workpieces and the dies a predetermined relative amount prior to the closing of the dies for a second upsetting operation.

11. The device of claim 10 wherein said indexing means comprises a pair of jaws on opposite sides of the dies.

12. Tooling for pressure welding comprising:
 (a) first and second split dies each adapted to grip a workpiece and each having a weld formation face;
 (b) guide means connected to the dies to maintain the faces oriented in face to face relationship; and,
 (c) indexing means operatively connected to the dies to hold a pair of workpieces while the dies are opened and to control the amount of relative movement of the workpiece and the dies to a predetermined relative amount prior to the closing of the dies for an upsetting operation.

References Cited in the file of this patent
UNITED STATES PATENTS

| | | |
|---|---|---|
| 2,779,954 | Barns | Feb. 5, 1957 |
| 2,909,951 | Rozmus | Oct. 27, 1959 |
| 2,925,654 | Rozmus | Feb. 23, 1960 |